Patented Mar. 11, 1924.

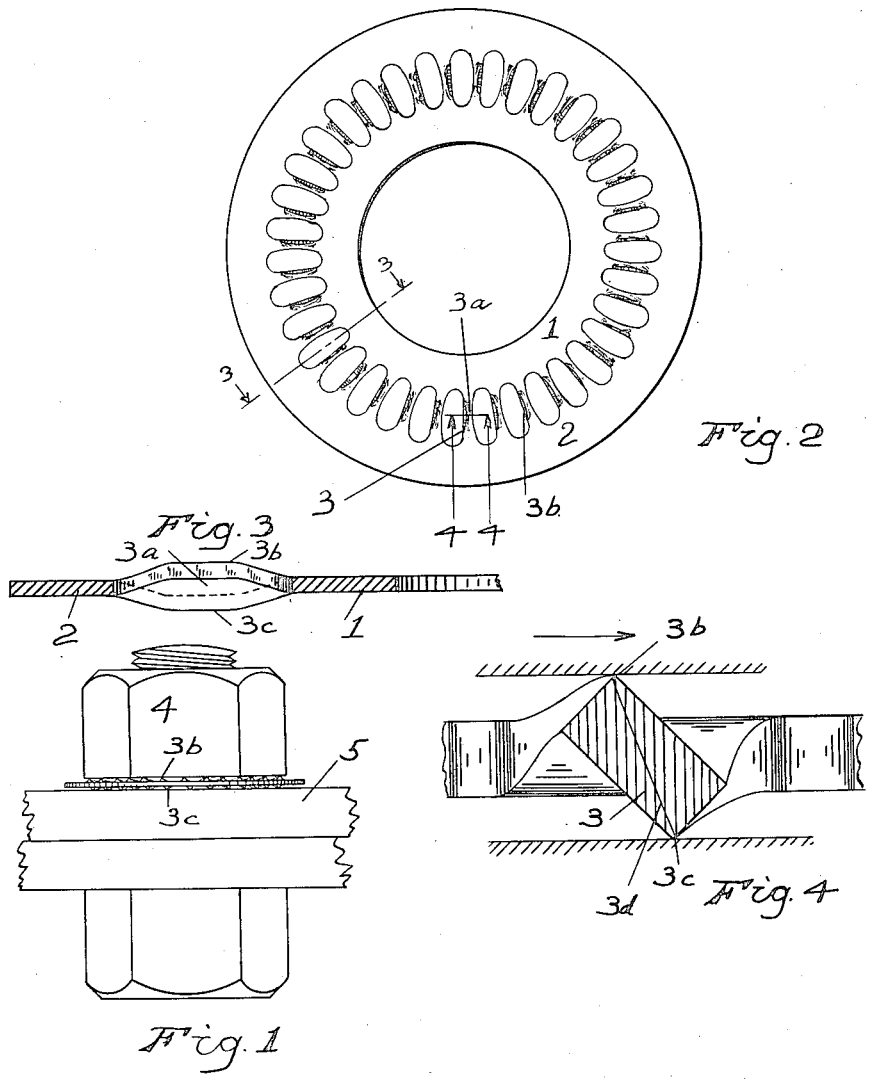

1,486,347

UNITED STATES PATENT OFFICE.

RICHARD THOMAS HOSKING, OF WILMETTE, ILLINOIS, ASSIGNOR TO SHAKEPROOF SCREW & NUT LOCK COMPANY, OF CHICAGO, ILLINOIS, A CORPORATION OF DELAWARE.

LOCK WASHER.

Application filed July 16, 1923. Serial No. 651,798.

*To all whom it may concern:*

Be it known that I, RICHARD T. HOSKING, a citizen of the United States, residing at Wilmette, in the county of Cook and State of Illinois, have invented certain new and useful Improvements in Lock Washers; and I do hereby declare the following to be a full, clear, and exact description of the invention, such as will enable others skilled in the art to which it appertains to make and use the same.

This invention relates to lock washers and pertains more particularly to lock washers stamped from spring sheet metal and provided with radially extending axially twisted prongs of spring material, the prongs adapted to be slightly distorted from their twisted position, that is, sprung down approximately to their original flat position, when the nut is screwed tightly down upon the work.

Such prongs have a tendency to return, by reason of their spring-like nature, to their normal or twisted position and causing their diagonally upper and lower edges to bite into the nut and work respectively, thereby overcoming the tendency for the nut to unscrew when subjected to vibration.

A washer of the general type above referred to is shown in my Patent No. 1,419,564, issued June 13, 1922.

My present improvement is more especially adapted for use with nuts and bolts of larger diameter, or those which in practice are intended to be screwed down with great force upon the work.

By my present invention I provide twisted prongs that are supported both at their inner and outer ends. In other words, I form the prongs from the material of the body of the washer as heretofore, but surround them by an integral annular ring that supports their outer ends, thereby producing a washer of great strength to resist unscrewing, yet capable of being made of thin and relatively inexpensive material.

With the foregoing and certain other objects in view which will appear later in the specifications, my invention comprises the devices described and claimed and the equivalents thereof.

In the drawings, Fig. 1 is a side view partly in section showing the washer in use.

Fig. 2 is a plan view of the washer.

Fig. 3 is an enlarged section on the line 3—3 of Fig. 2.

Fig. 4 is an enlarged transverse section through one of the prongs, the section being taken on the line 4—4 of Fig. 2.

As is clearly shown in the drawings, the lock washer is stamped in one piece from a sheet of steel or similar material and after completion it is hardened and tempered as is usual in washers of this kind. The washer consists essentially of two concentric annular rings 1, 2, spaced apart and connected by a plurality of radially disposed prongs or strips 3. These strips are spaced apart circumferentially and are formed integral with the rings. Each radial strip 3 is twisted about forty-five degrees axially at its middle $3^a$ so that the middle parts only of its diagonally opposite upper and lower edges $3^b$, $3^c$ are caused to project respectively above the upper and lower faces of the washer. The middle part of each strip 3 is preferably made slightly thinner than the body of the washer, so that the twisted spring tooth will not completely assume the flat position of the washer body, but will always remain at a slight angle of twist with respect to the surfaces of the nut and work, so as to be always in position to bite into the work and screw as soon as a tendency to unscrew is developed.

When the nut 4 is screwed tightly upon the work 5 the twisted strips 3 are sprung downward into approximately their original flat position, but their diagonally opposite upper and lower edges $3^b$, $3^c$, by their resilience are caused to bite into the face of the nut 4 and the face of the work 5 and prevent unscrewing.

The long diameter $3^d$ of the strip or teeth 3, as shown in Fig. 4, tends to roll slightly if the nut is formed in the reverse direction, as shown by the arrow, and upon rolling its long diameter acts as a strut between the face of the work and the face of the nut, as in my previous patent above referred to.

It will be understood, however, that the purpose of a lock washer is to prevent unscrewing and that the actual motion of rolling or turning does not necessarily take place to any considerable extent unless the nut is actually moved in the reverse direction. The strut action is nevertheless present and resists the tendency to prevent commencement of unscrewing.

By the means above described I have produced a simple and inexpensive lock washer that can be made from spring sheet material and in relatively large sizes. The teeth or strips 3 being supported at both ends are exceptionally strong and rigid, although the material from which the washer is made may be thin and light.

Having thus described my invention, what I claim and desire to secure by Letters Patent is:

1. An annular washer of sheet metal formed to provide a plurality of radially disposed strips spaced apart circumferentially, each of said strips twisted axially at its middle, whereby to cause the middle parts of its diagonally opposite upper and lower edges normally to project respectively beyond the upper and lower faces of the washer, said strips made of spring material.

2. An annular washer of spring sheet metal formed to provide a plurality of radially disposed strips spaced apart circumferentially, each strip connected at both its ends to the body of said washer and twisted axially at its middle so that the middle parts of its diagonally opposite upper and lower edges normally project respectively beyond the upper and lower faces of said body.

3. An annular washer of spring sheet metal formed to provide a plurality of radially disposed strips spaced apart circumferentially, each strip connected at both its ends to the body of said washer, the middle part of each strip thinner than its ends, said middle part twisted axially so that its diagonally opposite upper and lower edges normally project respectively beyond the upper and lower faces of said body.

In testimony whereof, I affix my signature in presence of two witnesses.

RICHARD THOMAS HOSKING.

Witnesses:
   W. B. SEAVERT,
   A. J. KOEHLER.